Patented Apr. 18, 1939

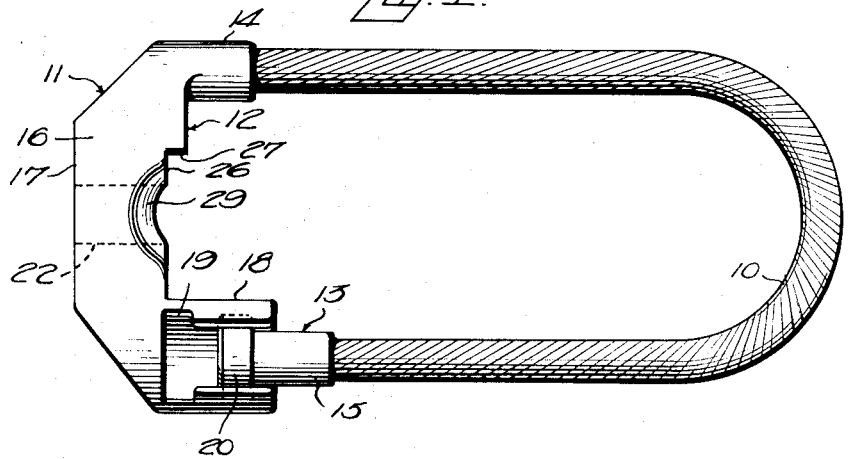
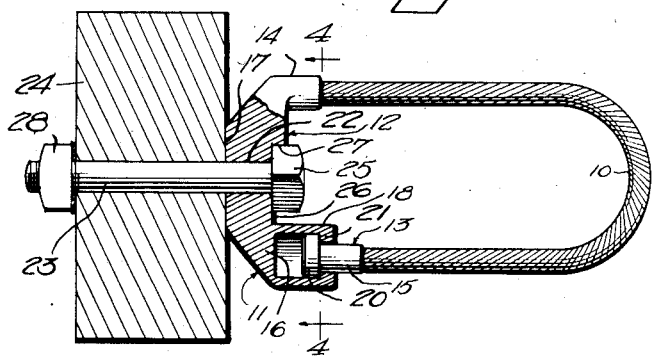
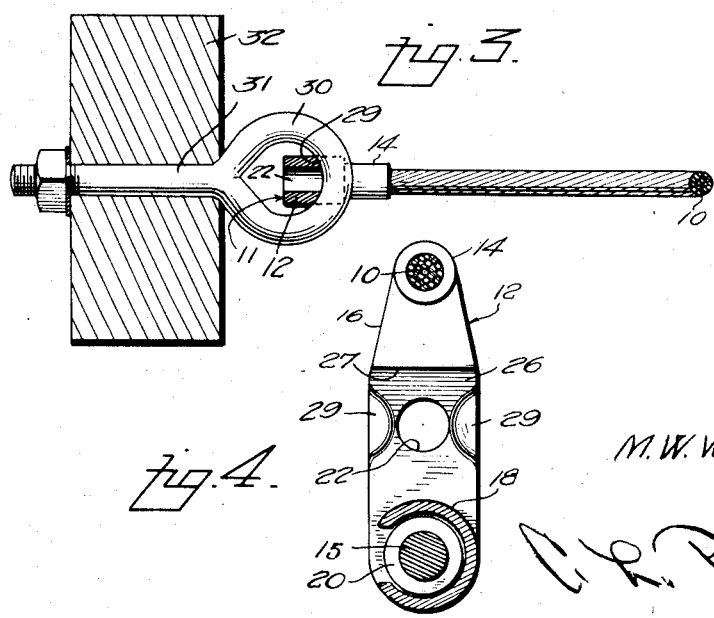

2,154,881

UNITED STATES PATENT OFFICE 2,154,881

INSULATOR CLEVIS

Millard W. Wertman, Allentown, Pa., assignor to Utilities Service Company, Allentown, Pa., a corporation of Pennsylvania Application November 24, 1936, Serial No. 112,579

2 Claims. (Cl. 174—207)

This invention relates to insulator clevises, and is an improvement over the patent to Herbert E. Miller, No. 2,053,729, granted September 8, 1936.

In the patent referred to, there is disclosed an insulator clevis formed of a flexible insulator-embracing member having its free ends adapted to be connected to each other by a yoke formed of complementary sections which may be anchored in position with respect to the element by which it is adapted to be supported. In such construction, highly advantageous results were obtained, but the device is limited as to the types of supporting means to which it may be connected, it being necessary to utilize an eye or U-shaped member for engaging the yoke and supporting it in position. In one form of the patented construction, an extended threaded shank is adapted to be directly threaded into a rigid support.

An important object of the present invention is to provide an insulator clevis having all of the advantages of the structure of the patent referred to, and which is adapted to be supported in a number of different ways so as to render it capable of universal application wherever a device of this character is employed.

A further object is to provide a device of the character referred to which is provided with a yoke member formed of separable sections and which is adapted to be connected to a suitable support by a screw or bolt, and which is adapted with equal facility to be supported by an eye or similar element.

A further object is to provide a device of this character wherein the yoke is provided with integral means for preventing the turning of a head of a bolt when the device is supported by such an element.

A further object is to provide a yoke of the character indicated having a flat end adapted to seat squarely against a rigid support, such as a pole cross arm, when the device is to be secured to such a support by a screw or bolt.

Other objects and advantages of the invention will become apparent during the course of the following description.

In the drawing I have shown one embodiment of the invention. In this showing:

Figure 1 is a face view of the device,

Figure 2 is a sectional view showing the device rigidly attached to a support, parts being shown in elevation, Figure 3 is a similar view showing a universal connection of the device to a support, and, Figure 4 is a section on line 4—4 of Figure 2, the bolt being omitted.

Referring to the drawing the numeral 10 designates a flexible insulator-embracing element, preferably formed of steel cable, the individual strands of which may be copper coated. The body 10 is adapted to support a conventional insulator, and because of its flexibility, the body adjusts itself to the contour of the insulator, thus distributing the pressure thereagainst.

A yoke indicated as a whole by the numeral 11 is made up of a pair of complementary elements 12 and 13, and this yoke is adapted to be connected to a support in either of several ways to be referred to. The yoke member 12 is provided with an extended stud 14 butt welded to one end of the flexible member 10. The member 13 is likewise provided with a shank 15, similar to the stud 14 and butt welded to the other end of the flexible body 10.

The yoke member 12 forms the main body portion of the yoke as a whole and comprises a transverse relatively heavy portion 16 having a flat face 17 facing away from the flexible body 10 and adapted to seat squarely against a suitable support, as will become apparent. The yoke member 12 is provided with a pair of arms one of which is formed by the stud 14, and the other of which comprises a socket member 18. As shown in Figures 1 and 2 this socket member is provided with an opening in one side enlarged at one end as at 19 to permit the entrance into the socket of a head 20 formed integral with the shank 15. Upon the application of a pulling force on the device, the head 20 moves longitudinally in the socket into engagement with a shoulder 21, as shown in Figure 2. While the device is under the tension to which it is normally subjected, it will be apparent that the head 20 cannot become disconnected from the socket 18.

The body portion 16 of the yoke member 12 is provided with a central opening 22 therethrough for the reception of a bolt 23, as shown in Figure 2, whereby the device is adapted to be attached rigidly to a support 24, such as a pole arm. The head 25 or nut 28 of the bolt is adapted to seat against the flat inner face 26 of the yoke member 12, and to one side of the bolt opening 22, the inner face of the yoke member 12 is provided with a shoulder 27 engageable with the head 25. The bolt, of course, is provided with the usual nut 28 for drawing up the yoke member 12 against the support 24.

The device also is adapted to be universally connected to a support, when desired, to permit it to assume different angles with respect thereto. As shown in Figures 1, 3 and 4, the body of the yoke member 10 is provided on opposite sides of the bolt opening 22 with curved cut away portions 29. These cut away portions may be utilized for engagement with the eye 30 of an eye bolt 31, shown as extending through a support 32. It will be apparent that the cut away portions 29 form a curved seat for engagement with the eye 30.

The operation of the device is as follows:

With the member 13 disconnected from the socket 18, the corresponding end of the flexible body 10 may be swung outwardly to permit the placing of an insulator in position within the body 10. The free end of the flexible body is then swung inwardly, and the head 20 is inserted into the opening 19. Regardless of the type of supporting means employed for the device, a tension is always exerted which, when initially applied, draws the head 20 through the socket 18 into engagement with the shoulder 21. The maintenance of tension on the device obviously prevents any possibility of the displacement of the head 20 from the socket 18. The sides and curved end of the flexible body 10 engage in the usual grooves provided in the insulator.

Depending upon the particular installation, the clevis either may be rigidly or universally supported. When the device is to be rigidly supported, the flat face 17 is adapted to seat solidly against the support, such as the bolt arm 24, as shown in Figure 2. This support is drilled to provide an opening for the reception of the bolt 23, and the inner face of the head 25, or of the nut 28, if the bolt is reversed, engages the face 26, while one side of the head 25 or nut 28 is arranged adjacent the shoulder 27. Thus the nut 28, or head 25, if the bolt is in reversed position, may be tightened to draw the face 17 into rigid engagement with the support, and the shoulder 27 prevents the turning of the bolt while the nut 28 is being tightened, or the turning of the nut while the bolt is being tightened. The face 17 provides bearing surface of substantial area to assist in rigidly supporting the device with respect to the support.

The device also is equally adapted to be supported by means of an eye bolt or similar element. Such a mounting is illustrated in Figure 3, and it will be apparent that the cut away portions 29 of the yoke member 12 provide a transversely curved groove or seat in which a portion of the eye 30 is engageable. With such a mounting, the clevis is adapted to assume any angular position with respect to the eye bolt 31 or any similar connecting device.

From the foregoing it will be apparent that the present device provides, in a single design, a strain insulator clevis which is so constructed as to permit it to be used at any point where devices of this character commonly are employed. Thus it is unnecessary to provide different types of clevises in accordance with the particular installations. Thus jobbers, electric power companies, etc., are required to stock only one type of insulator clevis.

It is to be understood that the form of the invention herewith shown and described is to be taken as a preferred example of the same and that various changes in the shape, size and arrangement of parts may be resorted to without departing from the spirit of the invention or the scope of the subjoined claims.

I claim:

1. An insulator clevis comprising a flexible normally substantially U-shaped body and a yoke formed of complementary members, one of said complementary members forming the body of the yoke and having an opening therethrough arranged longitudinally with respect to the line of pull on the clevis to receive a headed fastening element, said complementary member being provided with a substantially flat bearing surface facing away from said flexible member, said complementary member being provided at opposite ends with arms integral therewith arranged parallel to each other and extending toward said flexible member, one of said arms forming a stud to the free end of which one end of said flexible member is connected, the other arm forming a socket detachably receiving the other complementary member to which the other end of said flexible member is connected, said stud and the second named complementary member, when the latter is arranged in said socket, being spaced apart a distance substantially equal to the distance between the opposite sides of said flexible member and a greater than the width of the head of said fastening element.

2. An insulator clevis comprising a flexible normally substantially U-shaped body and a yoke formed of complementary members, one of said complementary members forming the body of the yoke and having an opening therethrough arranged longitudinally with respect to the line of pull on the clevis to receive a headed fastening element, said complementary member being provided with a substantially flat bearing surface facing away from said flexible member, said complementary member being provided at opposite ends with arms integral therewith arranged parallel to each other and extending toward said flexible member, one of said arms forming a stud to the free end of which one end of said flexible member is connected, the other arm forming a socket detachably receiving the other complementary member to which the other end of said flexible member is connected, said stud and the second named complementary member, when the latter is arranged in said socket, being spaced apart a distance substantially equal to the distance between the opposite sides of said flexible member and greater than the width of the head of said fastening element, the inwardly facing surface of said first named complementary member forming a seat for the head of the fastening element and being provided with a shoulder spaced from and independent of said arms for engagement with one side of the head of the fastening element.

MILLARD W. WERTMAN.